Sept. 27, 1960  E. V. SUNDT  2,953,944
MULTIPLE SPEED REDUCER
Filed Nov. 16, 1955  2 Sheets-Sheet 1
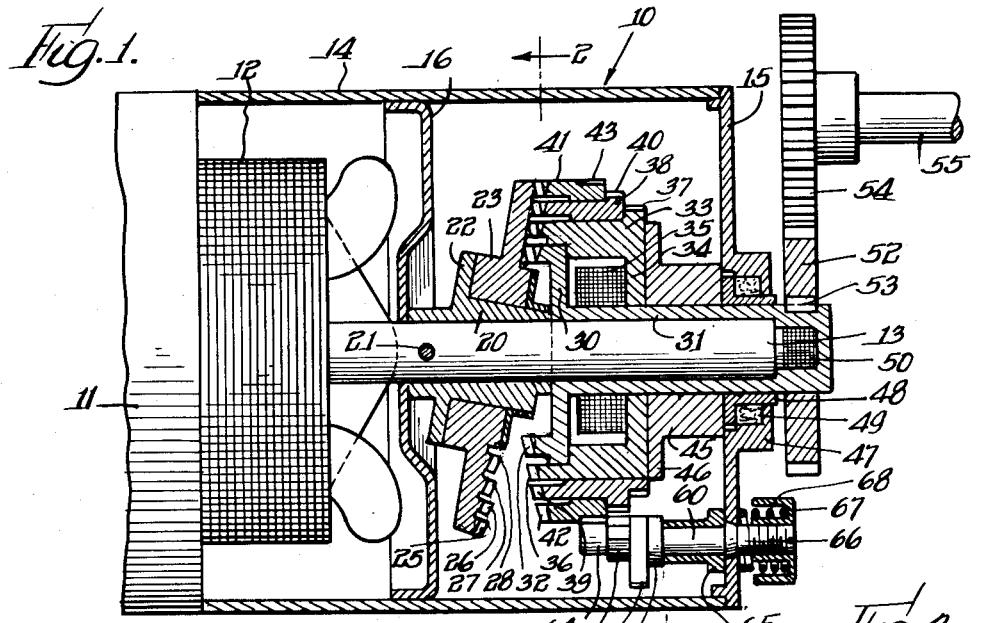
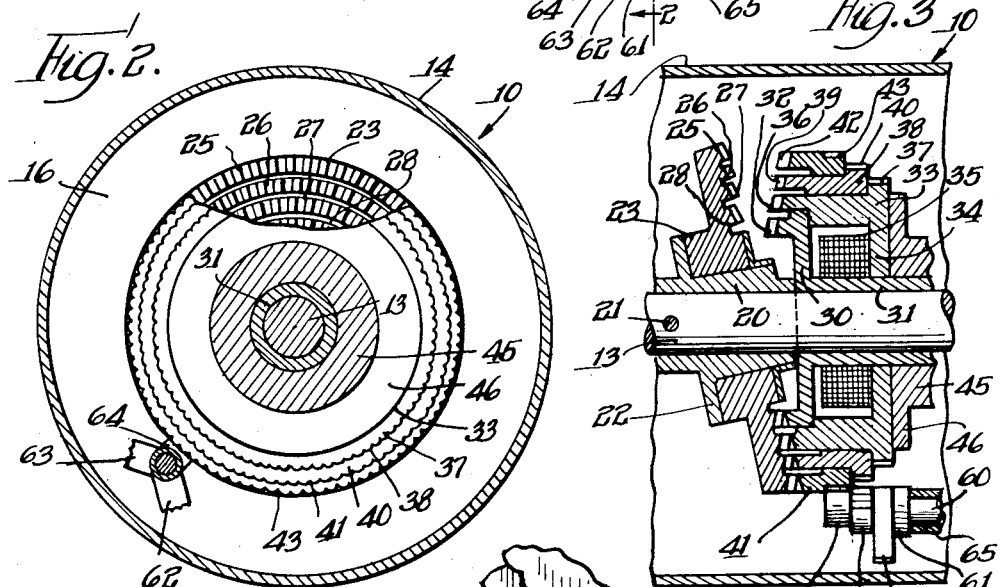
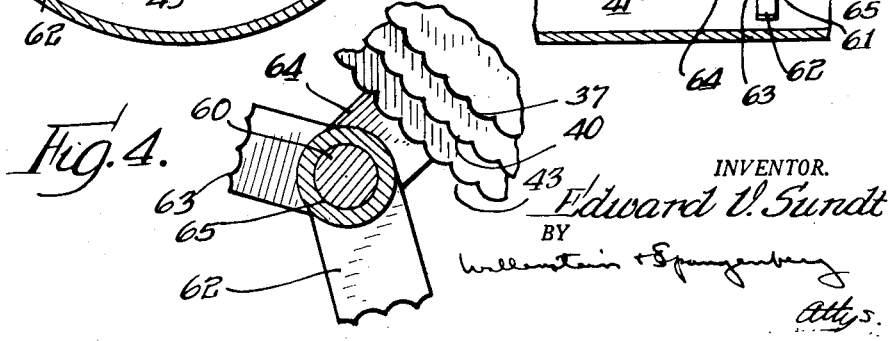
INVENTOR.
Edward V. Sundt
BY
Wullenstein + Spangenberg
Attys.

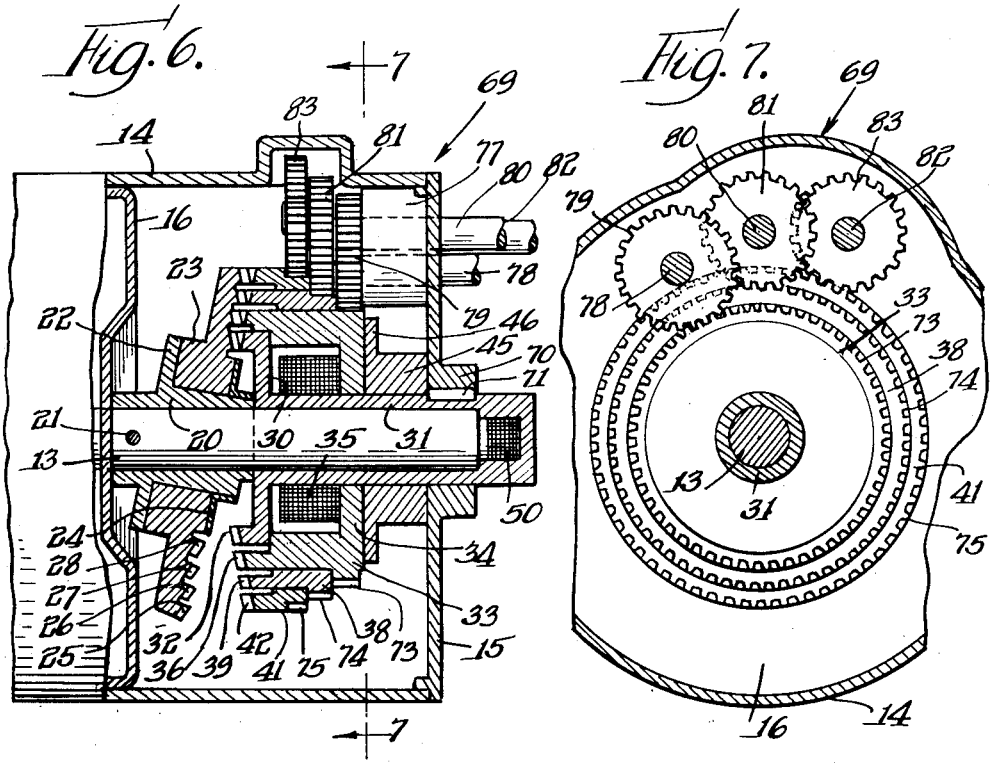
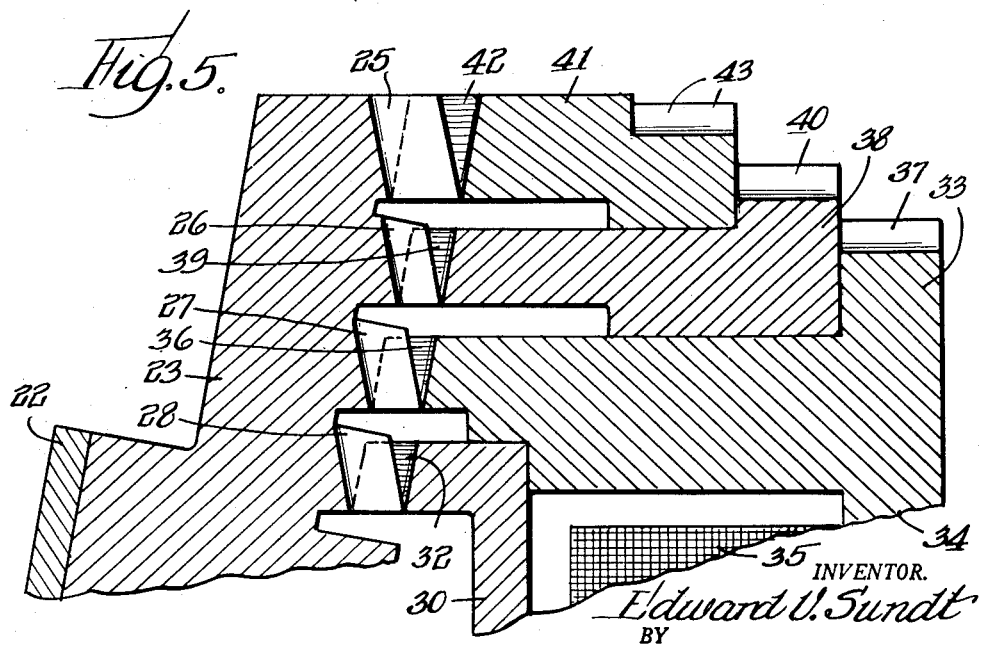

United States Patent Office 2,953,944
Patented Sept. 27, 1960

2,953,944

MULTIPLE SPEED REDUCER

Edward V. Sundt, 118 Sterling Lane, Wilmette, Ill.

Filed Nov. 16, 1955, Ser. No. 547,129

12 Claims. (Cl. 74—750)

The principal object of this invention is to provide a speed reducer, wherein desired different output speeds may be obtained with a fixed input speed, and wherein a single driven means may be selectively driven at desired speeds or wherein a plurality of driven means may be continuously driven at respectively different speeds.

Briefly, the multiple speed reducer includes a rotating input shaft, an oblique eccentric secured to the shaft for rotation therewith, and a wobbler member rotatably mounted on the oblique eccentric and wobbled thereby. The wobbler member is provided with at least three rings of gear teeth concentrically arranged thereon and preferably these rings of gear teeth are arranged on one side of the wobbler member. At least three relatively rotatable toothed gear members are concentrically arranged about the shaft and they mesh respectively with the rings of gear teeth on the wobbler member. These toothed gear members are preferably arranged adjacent the wobbler member in nested relation and supported by the rotating shaft to form a compact unit.

Means are provided for securing one of the gear members against rotation to cause the same to react against the wobbler member to control the same and hence rotation of the other gear members and driven means are driven by at least one of said other gear members. Where it is desired to selectively drive a single driven means at selectively different speeds, the driven means is driven by one of the gear members and means are provided for selectively securing the other gear members against rotation. Where it is desired to continuously drive a plurality of driven means at respectively different speeds, one of the gear members is secured against rotation and the plurality of driven means are driven by the other gear members. By appropriately selecting the numbers of teeth in the rings of gear teeth on the wobbler member and the teeth on the gear members desired output speeds and speed ratios may be obtained.

To obtain two different output speeds, three gear members and three rings of teeth on the wobbler member are utilized. To obtain three different output speeds, four gear members and four rings of teeth on the wobbler member are used, and for additional different output speeds, additional gear members and rings of gear teeth may be used. The driven means operated at different speeds may be operated in the same direction or in opposite directions depending upon the selection of the numbers of teeth and as a result an extremely flexible and versatile multiple speed reducer is provided which is readily adaptable to many different uses, as for example, in drive mechanisms for phonographs where three speeds of forward operation, 33⅓, 45 and 78 r.p.m., are selectively desired; in drive mechanisms for tape and wire recorders where recording and playing at one or two speeds are desired and where rewinding is at speeds many times faster than the recording speed; in process timing units where a slow speed is desired in one direction for performing a timing cycle and a fast speed is desired in the opposite direction at the end of the cycle to rapidly restore the unit to the initial position; in automotive windshield wipers where back and forth oscillatory motion is desired and also one or more speeds of operation; and in vibrating mechanisms for vibrating screens for screening or cleaning purposes where relatively fast oscillatory motion is desired.

Further objects of this invention reside in the details of construction of the multiple speed reducer and in the cooperative relationships between the component parts thereof.

Other objects and advantages of this invention will become apparent to those skilled in the art upon reference to the accompanying specification, claims and drawings in which:

Fig. 1 is a vertical sectional view through one form of the multiple speed reducer of this invention and showing the same as applied to an electric motor.

Fig. 2 is a vertical sectional view taken substantially along the line 2—2 of Fig. 1.

Fig. 3 is a partial vertical sectional view similar to Fig. 1, but showing the oblique eccentric in a rotative position which is 180° from the position illustrated in Fig. 1.

Fig. 4 is an enlarged view of a portion of the mechanism illustrated in Fig. 2.

Fig. 5 is an enlarged sectional view showing the mating relationships between the gear teeth of the gear members and the rings of gear teeth on the wobbler member.

Fig. 6 is a vertical sectional view similar to Fig. 1, but showing another form of the multiple speed reducer of this invention.

Fig. 7 is a vertical sectional view taken substantially along the line 7—7 of Fig. 6.

Referring first to Figs. 1 to 3, one form of the multiple speed reducer of this invention is generally designated at 10 and it is illustrated as being applied to and driven by an electric motor having a housing 11 and a motor structure 12 for rotating a shaft 13. The multiple speed reducer is arranged concentrically about the extending shaft 13 and it is preferably enclosed by a cover 14 and end plate 15 which are suitably secured to the motor housing 11 in any desired manner as by elongated bolts or the like. Preferably the speed reducer mechanism is separated from the motor 12 by a grease guard 16 suitably secured in place within the cover 14, the shaft 13 extending through the guard 16.

The multiple speed reducer includes an oblique eccentric 20 which is preferably molded of porous iron and which is secured to and carried by the shaft 13 in any suitable manner as by a pin 21. As shown for purposes of illustration herein, the axis of the oblique eccentric 20 is arranged at an angle of substantially 10° with respect to the axis of the shaft 13, this angle producing extremely satisfactory results for the particular speed reducer herein illustrated. The oblique eccentric also is provided with a guide flange 22. Rotatably mounted on the oblique eccentric 20 adjacent its flange 22 is a wobbler member 23 which is preferably formed of molded nylon or the like. The wobbler member 23 is held on the oblique eccentric 20 adjacent the flange 22 by a retaining ring 24 which is pressed-fit onto the oblique eccentric 20. The wobbler member 23 rotates with respect to the oblique eccentric 20 and is also wobbled thereby. Preferably the oblique eccentric 20 is saturated with a lubricant for lubricating the rotating surfaces between it and the wobbler member 23. The wobbler member 23 is provided on one face with a plurality of concentrically arranged rings of gear teeth, four such rings being illustrated at 25, 26, 27 and 28, respectively, to provide three different output speds. If only two output speeds are desired, then only three rings of gear teeth are necessary and if larger numbers of output speeds are desired, the number of rings of gear teeth may be correspondingly increased. Preferably these rings of gear teeth are molded in the wobbler member 23, although they may be cut therein if so desired.

Rotatably mounted on the extended motor shaft 13, is a gear member 30 having a sleeve hub 31 extending outwardly beyond the shaft 13. This gear member 30 and its hub 31 are preferably formed of molded porous iron which also is impregnated with a lubricant for lubricating the rotating surfaces between the sleeve hub 31 and the motor shaft 13. The gear member 30 is provided with longitudinally facing gear teeth 32 which mesh with the ring 28 of gear teeth on the wobbler member 23. Rotatably mounted on and nesting with the gear member 30 is another gear member 33 which has a flange 34 rotatably bearing against the sleeve hub 31. The gear member 33 with its flange 34 co-operate with the gear member 30 and its sleeve hub 31 to define an enclosed annular chamber 35 which is filled with a woolen wick which, in turn, is impregnated with a lubricant for continuously supplying lubricant to the porous iron gear member 30 and sleeve hub 31. The gear member 33 is also provided with longitudinally extending gear teeth 36 which mesh with the ring 27 of gear teeth on the wobbler member 23. The gear member 33 is also provided with radially extending rounded teeth 37.

Rotatably mounted on and nesting with the gear member 33 is another gear member 38, this gear member 38 being provided with longitudinally extending teeth 39 which mesh with the ring 26 of gear teeth on the wobbler member 23. This gear member 38 is also provided with radially extending rounded teeth 40. Rotatably mounted on and nesting with the gear member 38 is a further gear member 41 having longitudinally extending teeth 42 meshing with the ring 25 of gear teeth on the wobbler member 23 and also having radially extending rounded teeth 48. The gear members 30, 33, 38 and 41 are accordingly nested in concentric relation about the motor shaft 13, they are all rotatable with respect to each other and the teeth thereof continuously mesh with the corresponding rings of gear teeth on the wobbler member 23. Preferably the gear members 33, 38 and 41 are formed of molded nylon or the like. The various gear members are held in rotatable nested relation by a collar 45, having a flange 46 engaging the flange 34 of the gear member 33, the collar 45 being secured to the sleeve hub 31 in any suitable manner as by a pressed-fit.

The end wall 15, which is preferably a die casting, is provided with a central hollow box 47 in which is secured a powdered bronze bushing 48 to provide an enclosed chamber 49 therebetween. The powdered bronze bushing 48 is impregnated with a suitable lubricant and the chamber 49 may contain a wick impregnated with a lubricant for supplying additional lubricant to the bushing 48. The bushing 48 operates to rotatably support the outer end of the sleeve hub 31 and also to rotatably support the outer end of the motor shaft 13, this bushing 48 thereby forming an outboard bearing directly for the sleeve hub 31 and indirectly for the motor shaft 13. The outer end of the sleeve hub 31 is also preferably provided with a cavity 50 for receiving a lubricant impregnated wick for supplying additional lubricant to the rotating surfaces between the sleeve hub 31 and the shaft 13.

In the form of the invention illustrated in Figs. 1 to 3, the gear member 30 is the driving gear and it drives a driven means through the sleeve hub 31. Here the driven means is shown for purposes of illustration to include a gear 52 secured to the sleeve hub 31 by a key 53, or the like, and the gear 52 may mesh with another gear 54 for rotating a shaft 55. The speed at which the gear member 30 and the driven means are rotated is determined by a selector mechanism which is shown in the lower parts of Figs. 1, 2 and 3 and in more details in Fig. 4.

The selector mechanism includes a shaft 60 which is provided with a shoulder 61 and three radially disposed arms 62, 63 and 64. The arms 62, 63 and 64 are provided with pointed teeth which are adapted to mesh with the rounded teeth 37, 40 and 43, respectively, on the respective gear members 33, 38 and 41. When the teeth on the arm 62 mesh with the rounded teeth 37, the gear member 33 is secured against rotation. Likewise, when the teeth on the arm 63 mesh with the rounded teeth 40 on the gear member 38, the gear member 38 is secured against rotation and when the teeth on the arm 64 mesh with the rounded teeth 43 on the gear member 41, the gear member 41 is secured against rotation. Thus, dependent upon the rotative position of the shaft 60, one or the other of the gear members 33, 38 and 41 are secured against rotation. A sleeve 65 is placed about the shaft 60 and is interposed between the shoulder 61 and the flat surface of the end plate 15 and this sleeve operates to resiliently hold the shaft 60 normal to the flat surface of the end plate 15 with the teeth on the arms 62, 63 or 64 in mesh with the rounded teeth 37, 40 or 43, respectively. The shaft 60 is provided with a screw-threaded extension 66 which extends through a tapered hole in the end plate 15. A knob 67 is screw-threaded onto the extension 66 and may be secured in place on the extension 66 by swedging a portion of the knob into a slot in the ends of the extension 66. In this way the knob 67 is secured against rotation on the shaft extension 66. Interposed between the knob 67 and the outer surface of the end plate 15 is a spring 68 which operates to resiliently hold the sleeve 65 against the inner flat surface of the end plate 15 in turn to resiliently hold the shaft 60 in a normal position with the teeth of the arms engaging the selected rounded teeth on the gear members. When the shaft 60 is rotated by the knob to shift from one position, for example, where the teeth on the arm 64 engage the rounded teeth 43 to another position where the teeth on the arm 63 engage the rounded teeth 40, the shaft 60 is allowed to tilt in the tapered hole in the end plate to permit this selective turning. It is noted that the curvatures of the teeth on the arms 62, 63 and 64 correspond, generally, to the curvatures of the teeth 43, 40 and 37, respectively, so that the arms, when moved into engagement with the respective gear members, are maintained in that position for securing the respective gear members against rotation. If, however, the load on the driven means should become excessive so as to produce a large reactive turning force on the gear member which is being held against rotation, this excessive reactive turning force will cause the shaft 60 to pivot in the tapered hole in the cover plate 15 and rotate to a position to release the gear member which had been secured thereby against rotation. Thus, the selector mechanism which selectively secures the gear members 33, 38 and 41 against rotation, includes resilient releasable means to allow the same to rotate in the event that the load upon the driven means becomes excessive. This effectively prevents stalling and burning out of the electric motor upon the occurrence of excessive loads upon the speed reducer.

For purposes of describing the operation of the multiple speed reducer 10 illustrated in Figs. 1 to 5, it is assumed that the shaft 13 is driven at a constant speed of 3,000 r.p.m. and that the numbers of teeth in the rings of gear teeth on the wobbler member 26 and on the gear members 30, 33, 38 and 41 are as follows: The ring 25 of gear teeth on the wobbler member contains 46 teeth and the number of meshing teeth 42 on the gear member 41 is 45. The ring 26 of gear teeth contains 67 gear teeth and the gear member 38 has 66 teeth 39 meshing therewith. The ring 27 of gear teeth contains 35 teeth and the teeth 36 on the gear member 33 are 36 in number. The ring 28 of gear teeth consists of 36 teeth and the gear member 30 has 35 teeth 32 meshing therewith.

Assuming that the arm 64 on the selector mechanism is rotated to the position to secure the gear member 41 against rotation, that gear member becomes the reaction gear for the wobbler member 23 and since the gear member 41 having 45 teeth has one less tooth than the ring 25 of gear teeth, which has 46 teeth, there is a tooth difference of one tooth which causes the wobbler member 33 to turn on its axis at the rate of $$\frac{3000}{46} = 65 \text{ r.p.m.}$$

in the shaftwise direction, i.e. the same direction in which the shaft 13 is rotated. If the teeth numbers were reversed so that the gear member 41 had more teeth than the number of teeth in the ring 25 of gear teeth, then the direction of rotation of the wobbler member 23 would be in the opposite direction, counter-shaftwise, i.e. a direction opposite to the direction of rotation of the shaft 13. This rotation of the wobbler member 23 is imparted to the gear member 30 through the meshing gear teeth 28 and 32. Since the ring 28 of gear teeth has 36 teeth and since there are 35 teeth 32 on the gear member 30, this relation of gear teeth causes the gear member 30 to rotate in a counter-shaftwise direction with respect to the wobbler member 23 at the rate of $$\frac{3000}{35} = 86 \text{ r.p.m.}$$

Since the rotation caused by the intermeshing of the gear member 30 and the wobbler member 23 is greater than the rotation caused by the intermeshing of the gear member 41 and the wobbler member 23, the resultant speed at which the gear member 30 is driven under these conditions is 86 r.p.m.—65 r.p.m.=21 r.p.m. in the counter-shaftwise direction. Thus, when the selector mechanism is manipulated to secure the gear member 41 against rotation, the gear member 30 and hence the driven means operated thereby is driven at a speed of 21 r.p.m. in a direction opposite to the direction of rotation of the shaft 13 which is operating at 3000 r.p.m.

If now the selector mechanism is manipulated to cause the toothed arm 63 thereof to engage and secure the gear member 38 against rotation, the gear member 30 and the driven means driven thereby are driven at a different speed. In this connection the ring 26 of gear teeth includes 67 teeth and the meshing gear member 38 has 66 teeth. Thus, the wobbler member 23 is driven in a shaftwise direction at a rate of $$\frac{3000}{67} = 45 \text{ r.p.m.}$$

When this rotation is subtracted from the rotation of 86 r.p.m., brought about by the intermeshing of the gear member 30 and the wobbler member 23, the resultant speed of the gear member 30 and hence the driven means operated thereby is 86 r.p.m.—45 r.p.m.=41 r.p.m. in the counter-shaftwise direction. Thus, when the selector mechanism is manipulated to secure the gear member 38 against rotation the driven means is driven in the same direction as before, but at 41 r.p.m. rather than 21 r.p.m.

When the selector mechanism is manipulated to cause the toothed arm 62 to engage and secure the gear member 33 against rotation so as to react against the wobbler member 23, no rotation is imparted to the wobbler member 23 since the number of teeth in the ring 27 of the wobbler member 23 is the same as the number of gear teeth 36 on the gear member 33, namely, 36 teeth. Thus, the only rotation imparted to the gear member 30 is caused by the meshing of the teeth on the gear member 30 with the ring 28 of gear teeth on the wobbler member 23. Accordingly, when the selector mechanism is manipulated to secure the gear member 33 against rotation the driven means is driven at 86 r.p.m. also in the counter-shaftwise direction.

Thus, with the particular embodiment here described, it is possible, by manipulating the selector mechanism, to selectively obtain output speeds of the driven means, of 21 r.p.m., 41 r.p.m. and 86 r.p.m. with the driven means always rotating in the same direction. By selecting different numbers of gear teeth on the various gears and rings of gear teeth, various desired speeds may be selectively obtained and also the gear member 30 and hence the driven means may be driven in one direction or the opposite direction, as desired. To obtain quiet operation with least amount of gear friction, it is desirable to so construct the gear teeth that as they are coming into engagement with each other there is substantially a point contact as distinguished from a line contact. Toward this end the top edges of the gears are arranged at an angle with respect to the radial axis of the gear members and the wobbler member. For the optimum results in the particular embodiment here described, and, as shown in more detail in Fig. 5, this angle is made equal to the angle of the oblique eccentric, namely 10°. It is found that quite satisfactory results are obtained if the top edges of the teeth on the gear members and the mating top edges of the teeth of the rings of teeth on the wobbler member, when in meshing relation, have a total radially inwardly diverging angle therebetween at least as great as the angle between the axis of the oblique eccentric and the axis of the shaft.

Another form of the multiple speed reducer of this invention is generally designated at 60 in Figs. 6 and 7. This form of the invention is very similar to the form of the invention illustrated in Figs. 1 to 4 and like reference characters have been utilized for like parts. The multiple speed reducer 69 differs, mainly, from the multiple speed reducer 10 by holding stationary the gear member 30 so that it acts as the reaction gear and by continuously taking off different output speeds through separate driven means associated, respectively, with the gear members 33, 38 and 41. In other words, in the multiple speed reducer 69, three separate driven means, operating at respectively different speeds, are at all times available, while in the multiple speed reducer 10 a single driven means is selectively driven at three different speeds.

In the multiple speed reducer 69 the end plate 15 is provided with a different boss 70 for supporting the outer end of the sleeve hub 31, and a key 71 or the like locks the sleeve hub 31 to the boss 70 for securing the gear member 30 against rotation. The selector mechanism is eliminated and the gear members 33, 38 and 41 are provided with standard spur gear teeth 73, 74 and 75, respectively. A journal block 77 is secured to the end plate 15 and it journals a shaft 78 having a gear 79 meshing with the gear teeth 73, a shaft 80 having a gear 81 meshing with the gear teeth 74, and a shaft 82 having a gear 83 meshing with the gear teeth 74. If the numbers of teeth on the wobbler member 33 and of the meshing teeth on the gear members 33, 38 and 41 are the same as described above, and assuming a one-to-one gear ratio between the gear members 33, 38 and 41 and the gears 79, 81 and 83, the shafts 82, 80 and 78 are driven in the same direction and at respective speeds of 21 r.p.m., 41 r.p.m. and 86 r.p.m. Of course, these respective speeds of rotation and the direction of rotation may be varied as desired by appropriate selection of the numbers of intermeshing teeth on the wobbler member and the gear members just as recited above.

While for purposes of illustration, two forms of this

I claim as my invention:

1. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, at least three relatively rotatable toothed gear members concentrically arranged in nested relation about the shaft adjacent said side face of the wobbler member and supported by the shaft and having teeth extending substantially axially thereof and meshing respectively with the rings of gear teeth on the wobbler member, the gear ratios between the respective rings of gear teeth and the gear members being such as to provide desired selected relative rotations of the wobbler member and gear members, means for securing one of the gear members against rotation to cause the same to react against the wobbler member to control the same and hence rotation of the other gear members, and driven means driven by at least one of said other gear members.

2. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, a first toothed gear member having a sleeve hub rotatably mounted on the shaft adjacent said side face of the wobbler member, a second toothed gear member rotatably mounted on the first gear member adjacent said side face of the wobbler member, at least a third toothed gear member rotatably mounted on the second gear member adjacent said side face of the wobbler member, said toothed gear members having teeth extending substantially axially thereof and meshing respectively with the rings of gear teeth on the wobbler member, the gear ratios between the respective rings of gear teeth and the gear members being such as to provide desired selected relative rotations of the wobbler member and gear members, means for securing one of the gear members against rotation to cause the same to react against the wobbler member to control the same and hence rotation of the other gear members, and driven means driven by at least one of said other gear members.

3. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, at least three relatively rotatable toothed gear members concentrically arranged in nested relation about the shaft adjacent said side face of the wobbler member and supported by the shaft and having teeth extending substantially axially thereof and meshing respectively with the rings of gear teeth on the wobbler member, the gear ratios between the respective rings of gear teeth and the gear members being such as to provide desired selected relative rotations of the wobbler member and gear members, means for securing the inner one of the nested gear members against rotation to cause the same to react against the wobbler member to control the same and hence rotation of the other nested gear members, and driven means driven by each of said other nested gear members.

4. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, at least three relatively rotatable toothed gear members concentrically arranged in nested relation about the shaft adjacent said side face of the wobbler member and supported by the shaft and having teeth extending substantially axially thereof and meshing respectively with the rings of gear teeth on the wobbler member, the gear ratios between the respective rings of gear teeth and the gear members being such as to provide desired selected relative rotations of the wobbler member and gear members, driven means driven by the inner one of the nested gear members, and means for selectively securing the other nested gear members against rotation to selectively cause the same to react against the wobbler member to control the same and hence the rotation of said inner gear member and the driven means driven thereby.

5. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, a first toothed gear member having a sleeve hub rotatably mounted on the shaft adjacent said side face of the wobbler member, a second toothed gear member rotatably mounted on the first gear member adjacent said side face of the wobbler member, at least a third toothed gear member rotatably mounted on the second gear member adjacent said side face of the wobbler member, said toothed gear members having teeth extending substantially axially thereof and meshing respectively with the rings of gear teeth on the wobbler member, the gear ratios between the respective rings of gear teeth and the gear members being such as to provide desired selected relative rotations of the wobbler member and gear members, means for securing the sleeve hub and hence the first gear member against rotation to cause the same to react against the wobbler member to control the same and hence rotation of the second and at least the third gear members, and driven means driven by each of the second and at least the third gear members.

6. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, a first toothed gear member having a sleeve hub rotatably mounted on the shaft adjacent said side face of the wobbler member, a second toothed gear member rotatably mounted on the first gear member adjacent said side face of the wobbler member, at least a third toothed gear member rotatably mounted on the second gear member adjacent said side face of the wobbler member, said toothed gear members having teeth extending substantially axially thereof and meshing respectively with the rings of gear teeth on the wobbler member, the gear ratios between the respective rings of gear teeth and the gear members being such as to provide desired selected relative rotations of the wobbler member and gear members, driven means driven by the sleeve hub of the first gear member, and means for selectively securing the second and at least the third gear members against rotation to selectively cause the same to react against the wobbler member to control the same and hence the rotation of the first gear member and the driven means driven thereby.

7. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, a first toothed gear member having a sleeve hub rotatably mounted on the shaft adjacent said side face of the wobbler member, a second toothed gear member rotatably mounted on the first gear member adjacent said side face of the wobbler member, at least a third toothed gear member rotatably mounted on the second gear member adjacent said side face of the wobbler member, said toothed gear members having teeth extending substantially axially thereof and meshing respectively with the rings of gear teeth on the wobbler member, the gear ratios between the respective rings of gear teeth and the gear members being such as to provide desired selected relative rotations of the wobbler member and gear members, a support for the sleeve hub adjacent the outer end thereof to provide an outboard bearing support for the shaft journalled in the sleeve hub, means for securing one of the gear members against rotation to cause the same to react against the wobbler member to control the same and hence rotation of the other gear members, and driven means driven by at least one of said other gear members.

8. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, a first toothed gear member having a sleeve hub rotatably mounted on the shaft adjacent said side face of the wobbler member, a second toothed gear member rotatably mounted on the first gear member adjacent said side face of the wobbler member, at least a third toothed gear member rotatably mounted on the second gear member adjacent said side face of the wobbler member, said toothed gear members having teeth extending substantially axially thereof and meshing respectively with the rings of gear teeth on the wobbler member, the gear ratios between the respective rings of gear teeth and the gear members being such as to provide desired selected relative rotations of the wobbler member and gear members, a support for the sleeve hub adjacent the outer end thereof to provide an outboard bearing support for the shaft journalled in the sleeve hub, means for securing the sleeve hub to the support to secure the sleeve hub and hence the first gear member against rotation to cause the same to react against the wobbler member to control the same and hence rotation of the second and at least the third gear members, and driven means driven by each of the second and at least the third gear members.

9. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, a first toothed gear member having a sleeve hub rotatably mounted on the shaft adjacent said side face of the wobbler member, a second toothed gear member rotatably mounted on the first gear member adjacent said side face of the wobbler member, at least a third toothed gear member rotatably mounted on the second gear member adjacent said side face of the wobbler member, said toothed gear members having teeth extending substantially axially thereof and meshing respectively with the rings of gear teeth on the wobbler member, the gear ratios between the respective rings of gear teeth and the gear members being such as to provide desired selected relative rotations of the wobbler member and gear members, a bearing support for the sleeve hub adjacent the outer end thereof to support the same and also to provide an outboard bearing support for the shaft journalled in the sleeve hub, driven means driven by the sleeve hub of the first gear member, and means for selectively securing the second and at least the third gear members against rotation to selectively cause the same to react against the wobbler member to control the same and hence the rotation of the first gear member and the driven means driven thereby.

10. In a speed reducer comprising a rotating shaft, an oblique eccentric secured to the shaft for rotation therewith, a wobbler member rotatably mounted on the oblique eccentric and wobbled thereby and having a plurality of rings of gear teeth concentrically arranged in substantially the same plane on one side face thereof with the teeth extending substantially axially thereof, a plurality of gear members concentrically arranged about the shaft and normal thereto and having teeth extending substantially axially thereof and meshing with the rings of teeth on the wobbler member, the gear ratios between the respective rings of gear teeth and the gear members being such as to provide desired selected relative rotations of the wobbler member and gear members, means for securing one of the gear members against rotation to cause the same to react against the wobbler member to control the same and hence the rotation of another of the gear members, and driven means driven by said other gear member, the improvement wherein, the top edges of the teeth on the gear members and the mating top edges of the teeth of the rings of teeth on the wobbler member, when in meshing relation, have a total radially inwardly diverging angle therebetween at least as great as the angle between the axis of the oblique eccentric and the axis of the shaft.

11. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, at least three relatively rotatable toothed gear members concentrically arranged in nested relation about the shaft adjacent said side face of the wobbler member and supported by the shaft and having teeth extending substantially axially thereof and meshing respectively with the rings of gear teeth on the wobbler member, the gear ratios between the respective rings of gear teeth and the gear members being such as to provide desired selected relative rotations of the wobbler member and gear members, means for securing one of the gear members against rotation to cause the same to react against the wobbler member to control the same and hence rotation of the other gear members, and driven means driven by at least one of said gear members, the top edges of the teeth on the gear members and the mating top edges of the teeth of the rings of teeth on the wobbler member, when in meshing relation, having a total radially inwardly diverging angle therebetween at least as great as the angle between the axis of the oblique eccentric and the axis of the shaft.

12. A multiple speed reducer comprising, a rotating shaft, an oblique eccentric secured to the shaft for rotation therewith, a wobbler member rotatably mounted on the oblique eccentric and wobbled thereby and having at least three rings of gear teeth concentrically arranged substantially in the same plane on one side face thereof with the teeth extending substantially axially thereof, at least three relatively rotatable toothed gear members concentrically arranged in nested relation about the shaft adjacent said side face of the wobbler member and supported by the shaft and having teeth extending substantially axially thereof and meshing respectively with the rings of gear teeth on the wobbler member, the gear ratios between the respective rings of gear teeth and the gear members being such as to provide desired selected relative rotations of the wobbler member and gear members, means for securing one of the gear members against rotation to cause the same to react against the wobbler member to control the same and hence rotation of the other gear members, and driven means driven by at least one of said other gear members, the top edges of the teeth on the gear members and the mating top edges of the teeth of the rings of teeth on the wobbler member, when in meshing relation, having a total radially inwardly diverging angle therebetween at least as great as the angle between the axis of the oblique eccentric and the axis of the shaft.

References Cited in the file of this patent

UNITED STATES PATENTS

| | | |
|---|---|---|
| 871,240 | Schoedelin | Nov. 19, 1907 |
| 871,337 | Hawley | Nov. 19, 1907 |
| 873,681 | Pendleton | Dec. 10, 1907 |
| 964,847 | Brunhouse | July 19, 1910 |
| 1,144,808 | Bronner et al. | June 29, 1915 |
| 1,794,514 | Chase | Mar. 3, 1931 |
| 1,808,539 | Gessner | June 2, 1931 |
| 2,132,951 | Hall | Oct. 11, 1938 |
| 2,785,590 | Sundt | Mar. 19, 1957 |
| 2,791,920 | Ray | May 14, 1957 |

FOREIGN PATENTS

| | | |
|---|---|---|
| 185,071 | Germany | May 16, 1907 |
| 349,813 | France | Apr. 12, 1905 |
| 860,968 | France | Oct. 15, 1940 |